No. 733,690. PATENTED JULY 14, 1903.
R. C. WRIGHT.
MEASURING GAGE.
APPLICATION FILED MAR. 19, 1903.
NO MODEL.

Witnesses
E. F. Stewart
C. N. Woodward

R. C. Wright, Inventor.
by C. A. Snow & Co.
Attorneys

THE NORRIS PETERS CO., PHOTO-LITHO., WASHINGTON, D. C.

No. 733,690. Patented July 14, 1903.

UNITED STATES PATENT OFFICE.

REISON C. WRIGHT, OF COLORADO SPRINGS, COLORADO.

MEASURING-GAGE.

SPECIFICATION forming part of Letters Patent No. 733,690, dated July 14, 1903.

Application filed March 19, 1903. Serial No. 148,586. (No model.)

*To all whom it may concern:*

Be it known that I, REISON C. WRIGHT, a citizen of the United States, residing at Colorado Springs, in the county of El Paso and State of Colorado, have invented a new and useful Measuring-Gage, of which the following is a specification.

This invention relates to measuring devices which may be employed for various purposes, but which are more particularly designed for the use of carpenters and builders in ascertaining the lengths and angularity of the various rafters and other timbers forming the substructure of roofs, and has for its object the production of a simply-constructed instrument whereby the various angles and lengths of the different rafters may be quickly and accurately determined; and the invention consists in certain novel features of the construction, as hereinafter shown and described, and specified in the claims.

Figure 1:
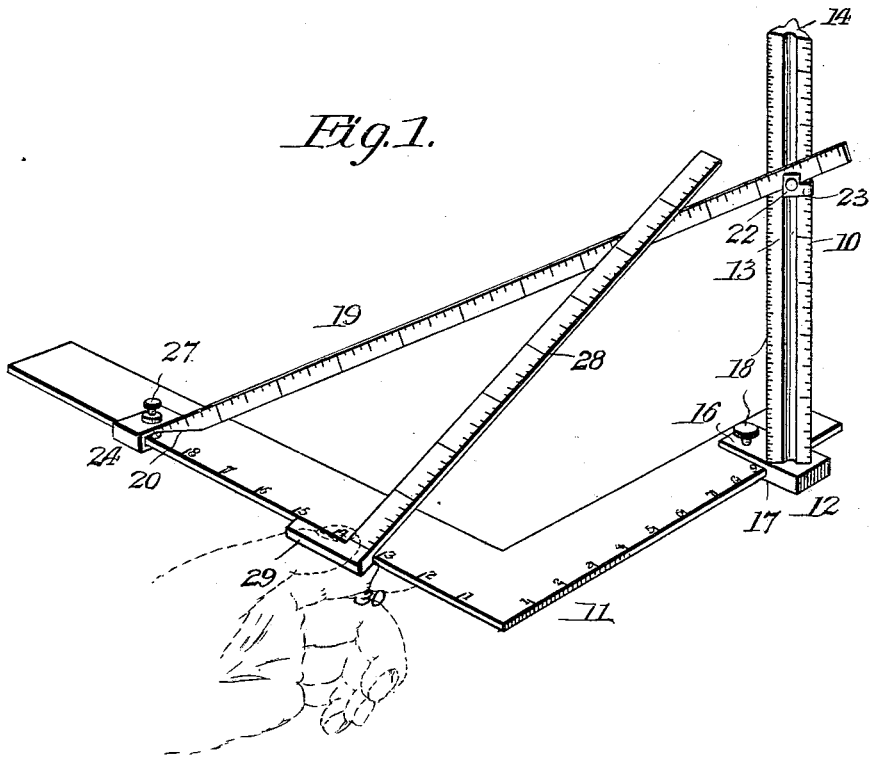
Figure 2:
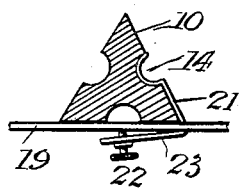
Figure 3:
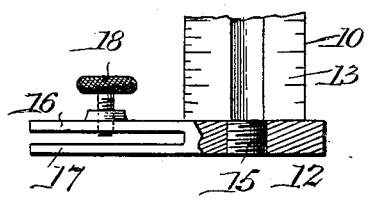

In the drawings illustrative of the invention, in which corresponding parts are denoted by like designating characters, Figure 1 is a perspective view of the device applied. Fig. 2 is a sectional detail illustrating the construction of the standard clamp. Fig. 3 is a sectional detail illustrating the coupling between the standard and its base-clip.

The improved device will usually be employed in connection with an ordinary carpenter's square, but may be employed with any form of graduated bar or rule, and I do not, therefore, wish to be limited to the use of the implement in connection with any specific graduated base member, but reserve the right to its use whenever it is capable of application.

The improved device consists of a graduated standard 10, adapted to be detachably connected at right angles to a graduated base member, such as a carpenter's square, (represented at 11,) the standard being adjustably coupled to the square by a clip 12, as shown in Fig. 1. The standard is preferably triangular in cross-section, as shown, with the graduations upon one or more faces, as at 13, and with a longitudinal groove 14 in another of its faces, as shown. The coupling means between the standard and base member consists of a body portion 12, having a threaded aperture in which a threaded stud 15 on the standard fits and with spaced transverse jaws 16 17 adapted to enclasp the base member and with a clamp-screw 18, operating through one of the jaws. By this means it will be obvious the standard may be adjustably coupled to the base member or detached therefrom, as desired.

Another element of the improved device consists of a graduated bar 19, having one end inclined, as at 20, which, for the purpose of definiteness, will be denoted the "primary" bar, and adapted to be adjustably clamped to the standard, as by a clamp consisting of an arm 21, having a curved terminal slidably engaging the groove 14 and with a clamp-screw 22 operating through its other arm 23 against the bar 19, as shown.

Another element of the improved device consists of a stop-clamp consisting of body portion 24, having spaced jaws adapted to enclasp the base member and connected thereto adjustably, as by a clamp-screw 27, as shown. By this arrangement the primary bar 19 may be adjustably coupled to the standard at any required angle and with the end 20 at any required point on the base member.

Another element of the invention consists of a graduated secondary bar 28, having a foot member 29 at right angles thereto, the foot member having a shoulder at 30, adapted to rest upon the outer edge of the base member 11, as shown in Fig. 1, and forms a means for supporting the bar in a slidable position relative to the base member. The relatively long foot member thus serves to maintain the bar 28 in a right-angled position relative to the base member, while at the same time permitting it to be projected over the primary bar 19 and adjusted to any point thereon, as will be obvious by reference to Fig. 1. The bars 19 and 28 and standard 10 will be graduated, and the graduations may be of any desired scale, but will generally be in inches and fractions of inches as usually employed by carpenters and builders. By this arrangement it is obvious that the instrument may be set to denote any degree of angularity between the parts, and by adjusting this angularity relative to the required lengths of the angular distances of parts of various structures, such as the rafters in roofs, the exact lengths of any rafter may be ascertained if the base length and "pitch" are known.

To illustrate the manner of using the instrument, suppose a building eighteen feet wide, which would give nine feet base length at each half of the roof. The standard 10 is set upon the L or short arm of a carpenter's square at the nine-inch graduation and the stop-clamp 24 set at the nine-inch graduation on the main or longer arm of the square, as shown in Fig. 1. The primary bar 19 is then clamped to the standard 10 by the clip 23 at the graduation thereon corresponding to the vertical height at the center of the roof, with the end 20 against the clamp 24, which gives the length and pitch of the "hip" or "valley" rafters. The secondary bar 28 is then set in position, as shown in Fig. 1, and will indicate the lengths of all the "jack" and "cripple" rafters in the roof, no matter how many angles there may be or how diverse are their lengths and pitches. By this simple means it is obvious any required angular length may be very quickly and accurately ascertained. The implement will be found especially valuable for ascertaining the angular lengths of the shorter gutter and jack rafters, which generally occur in inaccessible points difficult to measure by ordinary means; but with my improved implement the length of any of these parts may be very quickly ascertained.

The implement is extremely simple and inexpensive, and when not in use the parts can be disconnected and packed in a small box or casing or in a small compartment in a tool-chest.

The parts may be of any suitable material and may be modified in minor particulars without departing from the principle of the invention or sacrificing any of its advantages.

Having thus described my invention, what I claim is—

1. A framing-gage consisting of a graduated base member, a standard triangular in cross-section with one face graduated and a longitudinal groove in another of its faces, a clamping means adapted to detachably connect said standard to a graduated base member, a graduated primary bar engaging said base member, and a clamping means adapted to adjustably connect said bar to said standard, and provided with an extension engaging said longitudinal groove, substantially as specified.

2. A framing-gage consisting of a graduated base member, a graduated standard having a threaded stud extending from one end, a clamp member formed of spaced jaws and provided with a threaded aperture to receive said stud, a clamp-screw operating through one of said jaw members, a graduated primary bar, engaging said base member and a clamp means adapted to adjustably couple said bar and standard, substantially as specified.

3. A framing-gage consisting of a graduated base member, a standard having means for detachably engaging said base member, a graduated primary bar, a clamp means adapted to adjustably couple said bar and standard, and a stop for adjustable connection to said base member, substantially as specified.

4. The combination with a carpenter's square, of a graduated standard provided with means for detachably engaging said square, a graduated primary bar, a clamp means adapted to adjustably couple said bar to said standard with one end resting upon said square, and a graduated secondary bar having a stop-guide at one end at right angles thereto and adapted for slidable engagement with said square whereby said bar may be adjustably engaged movably with said primary bar, substantially as described.

5. A framing-gage, consisting of a graduated base member, a standard provided with means for detachably engaging said base member, a graduated primary bar, a clamp means adapted to adjustably couple said primary bar in an inclined position relative to said standard and a secondary graduated bar having a right-angled foot extension adapted to slidably support said secondary bar upon said base member and in movable connection with said primary bar, substantially as described.

6. A framing-gage consisting of a graduated base member, a graduated standard having a threaded stud extending from one end, a clamp member formed of spaced jaws for engaging said base member, and provided with a threaded aperture adapted to receive said stud, a clamp-screw operating through one of said jaw members, a graduated primary bar engaging said base member, a clamp means adapted to adjustably couple said bar and standard, and a secondary graduated bar movably supported by and extending between said base member and primary graduated bar, substantially as described.

In testimony that I claim the foregoing as my own I have hereto affixed my signature in the presence of two witnesses.

REISON C. WRIGHT.

Witnesses:
THOMAS DAVIES,
CLARENCE HEAP.